(12) United States Patent
Cicala et al.

(10) Patent No.: US 11,041,534 B2
(45) Date of Patent: Jun. 22, 2021

(54) METHOD OF CONTROLLING TRANSMISSION IN NEUTRAL

(71) Applicant: Ford Global Technologies, LLC, Dearborn, MI (US)

(72) Inventors: Stephen Michael Cicala, Dearborn Heights, MI (US); Markian Oleh Diakiw, Livonia, MI (US); Conor Edward Sullivan, Canton, MI (US); Dongdong Dee Li, Canton, MI (US); Timothy Fedullo, Northville, MI (US); Bradley Dean Riedle, Northville, MI (US); Scott Joseph Gittins, Ann Arbor, MI (US); Peter Wincek, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 16/525,138

(22) Filed: Jul. 29, 2019

(65) Prior Publication Data
US 2020/0032864 A1 Jan. 30, 2020

Related U.S. Application Data

(60) Provisional application No. 62/711,688, filed on Jul. 30, 2018.

(51) Int. Cl.
*F16D 48/06* (2006.01)
*F16H 61/04* (2006.01)
*F16H 63/48* (2006.01)

(52) U.S. Cl.
CPC ............ *F16D 48/062* (2013.01); *F16H 63/48* (2013.01); *F16H 2061/0481* (2013.01)

(58) Field of Classification Search
CPC ..................... F16H 2061/0481; F16D 48/062
See application file for complete search history.

(56) References Cited

U.S. PATENT DOCUMENTS

| | | | |
|---|---|---|---|
| 6,106,435 A | 8/2000 | Endo et al. | |
| 6,319,172 B1 | 11/2001 | Steinmetz et al. | |
| 7,267,633 B2 | 9/2007 | Hitch et al. | |
| 8,398,522 B2 * | 3/2013 | Bauknecht | F16H 3/663 475/275 |
| 9,222,531 B2 | 12/2015 | Biggs et al. | |
| 10,479,344 B2 * | 11/2019 | Schiele | B60K 6/48 |
| 10,850,602 B2 * | 12/2020 | Lahr | F16D 41/16 |
| 2018/0119597 A1 | 5/2018 | Styron | |

* cited by examiner

*Primary Examiner* — Ernesto A Suarez
*Assistant Examiner* — James J Taylor, II
(74) *Attorney, Agent, or Firm* — Vincent Mastrogiacomo; Brooks Kushman P.C.

(57) ABSTRACT

Ideally, when a transmission is in Neutral, no torque should be exerted on the vehicle wheels by the powertrain. However, even with all clutches in a gearbox disengaged, some torque may be transmitted from a turbine shaft to the transmission output due to clutch drag and transmission component inertia. To avoid transmitting torque, a subset of clutches may be engaged to produce an input tie-up state, this holding the turbine shaft against rotation while permitting rotation of the output element.

18 Claims, 3 Drawing Sheets

METHOD OF CONTROLLING TRANSMISSION IN NEUTRAL

CROSS-REFERENCE TO RELATED APPLICATIONS

This application claims the benefit of U.S. provisional application Ser. No. 62/711,688 filed Jul. 30, 2018, the disclosure of which is hereby incorporated in its entirety by reference herein.

TECHNICAL FIELD

This disclosure relates to the field of transmissions for motor vehicles. More particularly, the disclosure pertains to a method of operating a transmission to ensure that torque is not transmitted when neutral is selected.

BACKGROUND

Many vehicles are used over a wide range of vehicle speeds, including both forward and reverse movement. Most types of internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Many transmissions utilize friction clutches and brakes which are engaged in different combinations to establish different power flow paths having different speed ratios. One type of commonly used friction clutch is a wet multi-plate clutch. A clutch pack includes a set of friction plates splined to one component and interleaved with a set of separator plates splined to a different component. To engage the clutch, pressurized fluid is supplied to an apply chamber forcing a piston to squeeze the friction plates between the separator plates. Friction between the friction plates and separator plates prevents relative rotation, thereby coupling the two components to each other. When the fluid pressure is reduced, a return spring forces the piston away from the clutch pack removing the normal force such that relative rotation is possible with minimal drag.

Transmission may also use one-way clutches that passively prevent relative rotation between two components in one direction while permitting relative rotation in the opposite direction. An actively controlled one-way clutch includes selectable states such as permitting relative rotation in both directions or preventing relative rotation in both directions.

SUMMARY

According to one embodiment, a transmission includes a fluid coupling having an impeller and a turbine and a gearbox including a plurality of clutches and an output element. The gearbox is configured to establish various speed ratios between the turbine and the output element by engaging corresponding subsets of the clutches. A vehicle controller is programmed to, responsive to selection of a Neutral mode, engage a subset of the plurality of the clutches to hold the turbine stationary while permitting rotation of the output element.

According to another embodiment, a transmission includes a fluid coupling having an impeller and a turbine, a housing, and a gearbox disposed in the housing. The gearbox includes a turbine shaft connected to the turbine, an output element, a plurality of two-way clutches, and a selectable one-way clutch. The one-way clutch has a passive state in which the selectable one-way clutch is permitted to overrun in a first direction and lock in a second direction and has an active state in which the selectable one-way clutch is locked in both the first and second directions. A controller is programmed to, in response to the transmission being switched from a Drive mode to a Neutral mode and the selectable one-way clutch slipping below a threshold speed, command the selectable one-way clutch to the active state, command engagement of a first of the two-way clutches, and command disengagement of a remainder of the two-way clutches so the output element is permitted to rotate and the turbine shaft is rotationally locked to the housing. The controller is further programmed to, in response to the transmission being switched from the Drive mode to the Neutral mode and the selectable one-way clutch slipping above the threshold speed, command engagement of a second and a third of the two-way clutches and command disengagement of a remainder of the two-way clutches.

According to yet another embodiment, a method of shifting a transmission from Park to Neutral includes, responsive to a driver requesting Neutral, engaging a first subset of two-way clutches of the transmission such that the transmission is placed in a full tie-up condition. The method further includes, responsive to the transmission being in the full tie-up condition, (i) placing a selectable one-way clutch in an active state and (ii) engaging a second subset of the two-way clutches that is completely different than the first subset, wherein the second subset includes one or more of the two-way clutches that, when engaged with the selectable one-way clutch being in the active state, result in the transmission being in an input tie-up condition. The method also includes, responsive to the selectable one-way clutch being in the active state and the second subset of clutches being engaged, releasing all of the clutches expect for the second subset to place the transmission in the input tie-up condition.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
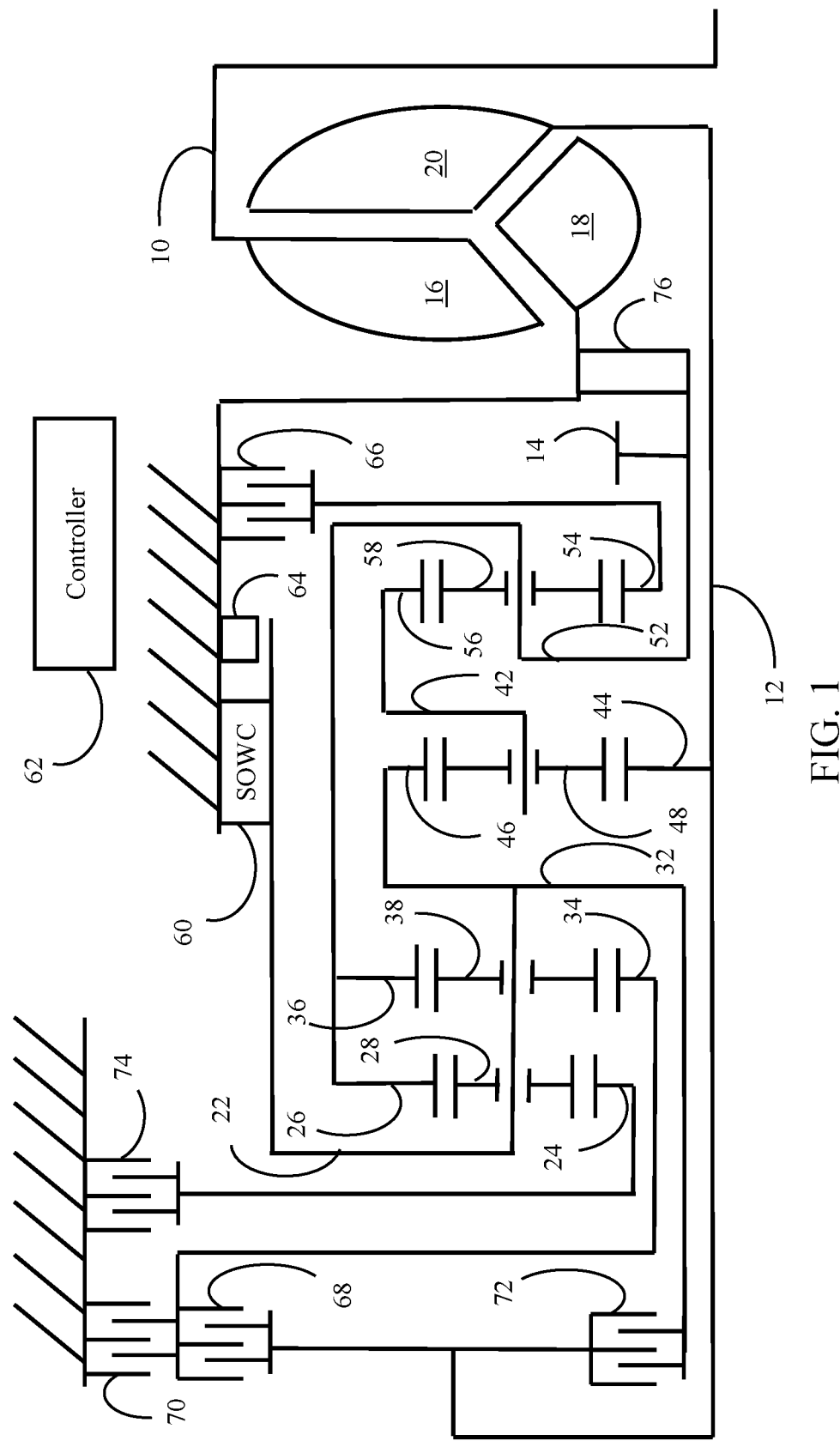
FIG. 1 is a schematic diagram of an automotive transmission.

FIG. 1 is a schematic diagram of a transmission gearbox and torque converter. Only the top half of the gearbox and torque converter are shown because most of the components are axisymmetric. A transmission input shaft 10 is driveably connected to a power source such as an internal combustion engine. Power is transferred from transmission input shaft 10 to turbine shaft 12 by the torque converter. Power is then transferred from the turbine shaft 12 to an output element 14 by the gearbox. Power is transferred from output element 14 to vehicle driving wheels via a final drive mechanism, differential, and axle (not shown). Although power flows primarily from the engine to the driving wheels, there are some operating conditions, such as coasting on downhill grades in which power flows in the opposite direction.

The torque converter includes an impeller 16, a stator 18, and a turbine 20. The impeller is fixed to input shaft 10. The stator 18 is attached to the transmission case via a one-way clutch. The turbine 20 is fixed to turbine shaft 12. Impeller 16 acts as a centrifugal pump propelling fluid in a toroidal pattern. When the impeller speed exceeds the turbine speed, the flowing fluid encounters blades of the turbine imparting a torque on the turbine. The stator 18 redirects the flow exiting the turbine and directs it back into the impeller. When the impeller spins substantially faster than the turbine, the torque exerted on the turbine is a multiple of the torque exerted by the impeller. The torque converter allows the engine to rotate and exert torque on the turbine shaft even when the turbine shaft is stationary or moving backwards. This characteristic is very useful for initiating vehicle movement from a standstill.

The gearbox includes a gearing arrangement, which is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. In the illustrated embodiment, the gearing arrangement includes four simple planetary gearsets, each having carriers 22, 32, 42, and 52; sun gears 24, 34, 44, and 54; ring gears 26, 36, 46, and 45; and planet gears 28, 38, 48, and 58. The sun gears, ring gears, and carriers are all supported for rotation about a central axis. Each planet gear is supported for rotation with respect to the respective carrier and meshes with the respective sun gear and ring gear. Turbine shaft 12 is fixed to sun gear 44. Output element 14 is fixed to carrier 54, ring gear 26, and ring gear 36. Carrier 22, carrier 32, and ring gear 46 are mutually fixed. Carrier 42 is fixed to ring gear 56.

The gearbox also includes shift elements for selectively holding the rotating elements, e.g., components of the planetary gear sets. In this document, the term shift element is a generic term coving both clutches and brakes. In this art, a "clutch" commonly denotes a shift element that selectively couples two rotatable elements to each other. The term, "brake" commonly refers to a shift element that holds a rotating element to the transmission case. When a clutch is in an engaged state, torque may be transmitted from one of the two elements to the other selectively coupled element. When a clutch is in a fully engaged state, the rotational speeds of the two elements are constrained to be equal. A friction clutch may be in partially engaged state in which the speeds are not equal but torque is transferred between the elements. When a clutch is in a disengaged state, the element speeds may differ and the only torque transferred is parasitic drag. In the illustrated embodiment, the gearbox includes five shift elements and a selectable one-way clutch (SOWC) 60

The selectable one-way clutch (SOWC) 60 selectively couples carriers 22 and 32 and ring gear 46 to the transmission case. SOWC 60 has a passive state and an active state. In the passive state, relative rotation is prevented in one direction but allowed in the opposite direction. The disengaged state on SOWC 60 may be referred to as an overrunning state. In the active state, SOWC 60 prevents relative rotation in both directions, i.e., acts as a brake. In other words, in the active state, it is always fully engaged. Unlike a friction clutch, SOWC 60 is not designed to operate in a partially engaged state. When SOWC 60 transitions from the passive state to the active state, any relative rotation is suddenly eliminated. Therefore, the transmission controller 62 is programmed not to command such a transition unless the slip across SOWC 60 is very low (less than 20 rpm). The slip may be measured by a speed sensor 64. Alternative, the slip may be calculated based on other speed sensors. SOWC 60 may not respond to a command to switch from active state to passive state while it is transmitting torque against the direction in which rotation would be allowed in passive state. Therefore, controller 62 needs to relieve such torque before commanding such a transition.

Friction clutch 66 selectively couples sun gear 54 to the transmission case. Friction clutch 68 selectively couples turbine shaft 12 to sun gear 34. Friction clutch 70 selectively couples sun gear 34 to the transmission case. Friction clutch 72 selectively couples turbine shaft 12 to carrier 22, carrier 32, and ring gear 46. Friction clutch 74 selectively couples sun gear 24 to the transmission case. Various speed ratios between turbine shaft 12 and output element 14 are established by fully engaging the clutches in combinations of two as shown in TABLE 1.

TABLE 1

|  | 66 | 68 | 70 | 60 | 72 | 74 | Speed Ratio |
|---|---|---|---|---|---|---|---|
| $1^{st}$ | X |  |  | Passive |  |  | 4.484 |
| 1M | X |  |  | Active |  |  | 4.484 |
| $2^{nd}$ | X |  |  |  |  | X | 3.146 |
| $3^{rd}$ | X |  | X |  |  |  | 2.872 |
| $4^{th}$ | X | X |  |  |  |  | 1.842 |
| $5^{th}$ | X |  |  |  | X |  | 1.414 |
| $6^{th}$ |  | X |  |  | X |  | 1.000 |
| $7^{th}$ |  |  | X |  | X |  | 0.742 |
| $8^{th}$ |  |  |  |  | X | X | 0.616 |
| Reverse |  | X |  | Active |  |  | −2.882 |

The speed ratio is the same in $1^{st}$ gear and in 1M. However, in $1^{st}$ gear, the transmission only transmits torque from the engine to the vehicle wheels. If the driver releases the accelerator pedal while coasting forward, SOWC 60 will overrun and the engine speed will fall to idle. In the 1M gear state, on the other hand, SOWC 60 is in the ACTIVE state, so torque can be transmitted from the vehicle wheels to the engine resulting in engine braking. In Reverse, SOWC 60 must be in the active state in order to transmit power from the engine to the vehicle wheels.

The driver controls the transmission by selecting among Park, Reverse, Neutral, Drive, and Low modes of operation. In Drive or Low, the transmission selects among the various forward gear states based on vehicle speed and torque demand. One difference between these modes is that the 1M state is selected in Low to provide engine braking whereas the $1^{st}$ gear state is utilized in Drive. In Reverse, the transmission selects the reverse gear state. In Park, the transmission engages parking pawl 76 to hold the vehicle stationary. In Neutral, the transmission allows vehicle movement but ideally does not transmit any torque between the engine and the vehicle wheels.

Friction clutches transmit some amount of parasitic drag torque even when commanded to fully released. When the transmission fluid is very cold, the drag torque can be sufficiently large to result in transmission of a noticeable amount of torque from turbine shaft 12 to output element 14. Therefore, release of all controllable clutches does not ensure zero output torque. Furthermore, some internal transmission components have sufficient inertia to act as reaction elements when the turbine speed changes rapidly. Thus, revving the engine can result in output torque even with all controllable clutches disengaged.

Transmission of torque from the engine to the vehicle wheels can be precluded by holding turbine shaft 12 stationary. A transmission clutch state that holds the turbine shaft stationary is called an input tie-up condition. A transmission clutch state that holds all rotatable gear elements stationary is called a full tie-up condition. All full tie-up conditions are also input tie-up conditions. However, some input tie-up conditions are not full tie-up conditions. A neutral state may be achieved by establishing an input tie-in condition in which the output shaft is not held stationary.

The transmission of FIG. 1 has two input tie-up clutch states in which the output element 14 may rotate. The first such input tie-up condition is established by fully engaging friction clutch 72 and commanding SOWC 60 to the active state. In this first input tie-up condition, the speed of output element 14 is unconstrained. The second input tie-up condition is established by fully engaging friction clutches 68 and 70. In this second tie-up condition, output element 14 is free to have a positive speed but is constrained by the passive action of SOWC 60 from having a negative speed. Thus, the vehicle is free to roll forward but would be constrained from rolling backwards.

Figure 2:
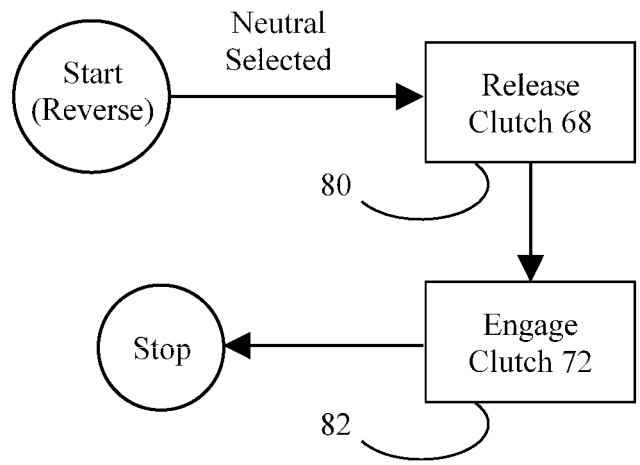
FIG. 2 is a flowchart illustrating a process for shifting the transmission of FIG. 1 from a Reverse mode to a Neutral mode.

FIG. 2 illustrates a process for transitioning from Reverse mode to a Neutral mode with turbine shaft 12 held stationary. Note from Table 1 that in Reverse, SOWC 60 is in the Active state and friction clutch 68 is fully engaged. At 80, the controller disengages friction clutch 68. At 82, the controller fully engages friction clutch 72. These actions place the gearbox in the first input tie-up condition.

Figure 3:
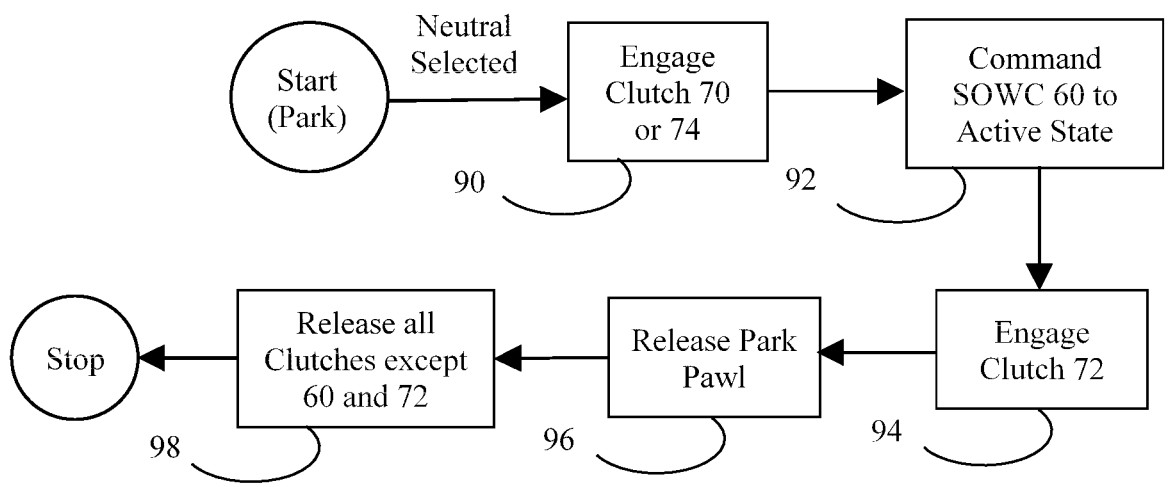
FIG. 3 is a flowchart illustrating a process for shifting the transmission of FIG. 1 from a Park mode to a Neutral mode.

FIG. 3 illustrates a process for transition from Park mode to a Neutral mode with turbine shaft 12 held stationary. For purposes of this illustration, it is assumed that all friction clutches are off in Park and SOWC is in the passive state. During a transition from Park, output element 14 will be stationary, both because it is held by a parking pawl and because an interlock mechanism requires applying vehicle brakes while disengaging Park. At 90, either clutch 70 or clutch 74 is fully engaged. Since ring gears 26 and 36 are stationary, stopping either sun gear 24 or sun gear 34 causes carrier 22/32 to become stationary. Once carrier 22/32 is stationary, SOWC can be commanded into the active state at 92. At 94, clutch 72 is fully engaged. In some transmissions, the parking pawls is mechanically linked to the shift selector such that the parking pawl is directly disengaged by the driver. In transmissions with park-by-wire, on the other hand, the controller must actively disengage the parking pawl. This may be accomplished, for example, by commanding engagement of particular clutches. In a park-by-wire transmission, the controller commands disengagement of the parking pawl at 96. Finally, at 98, the controller releases all clutches except 60 and 72. The transmission may be in a full tie-up state during portions of the process of FIG. 3. That is acceptable because the vehicle is initially stationary and the driver expects the vehicle to remain stationary until Neutral is achieved.

Figure 4:
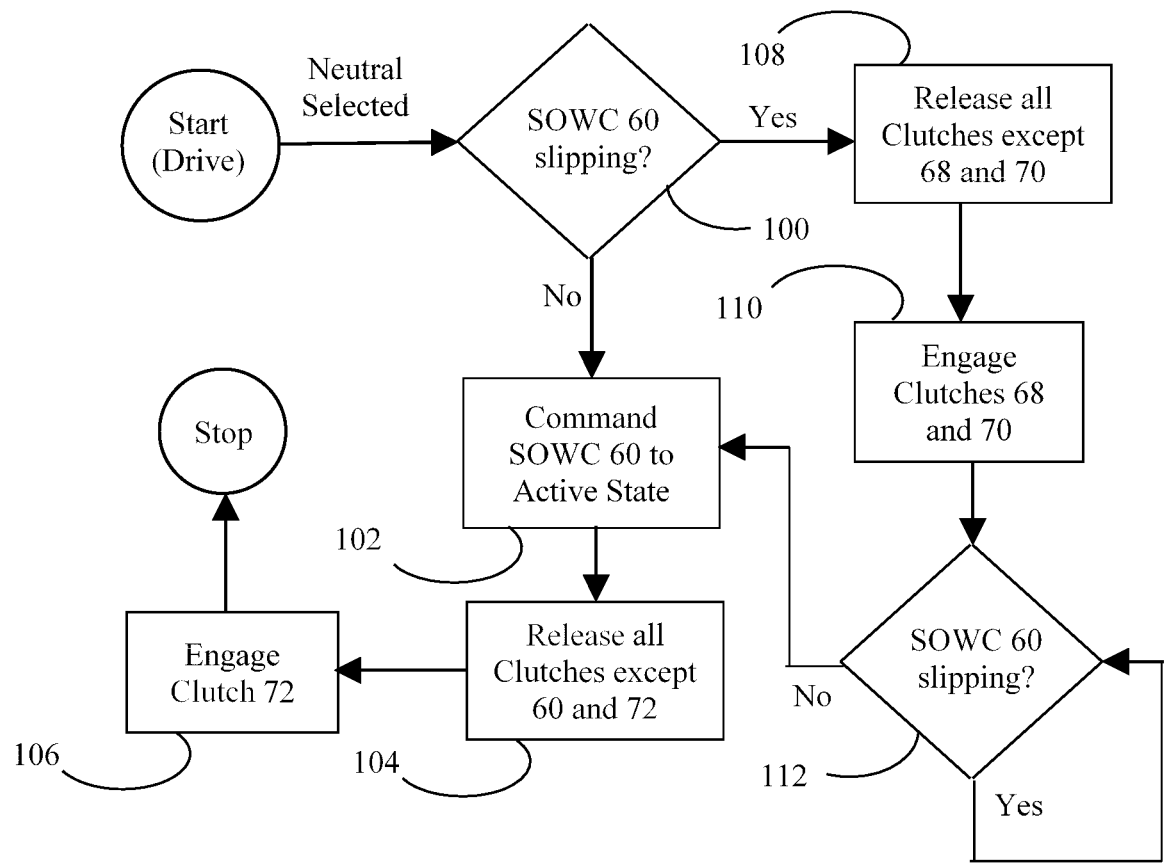
FIG. 4 is a flowchart illustrating a process for shifting the transmission of FIG. 1 from a Drive mode to a Neutral mode.

FIG. 4 illustrates a process for transition from Drive mode to a Neutral mode with turbine shaft 12 held stationary. This transition can occur in a variety of starting conditions. Depending on the current vehicle speed and clutch state, SOWC may or may not be slipping when Neutral is commanded. If SOWC 60 is not slipping when neutral is commanded, then it is commanded to active state at 102. All clutches except 60 and 72 are released at 104. Then, clutch 72 is engaged at 106 if it is not already engaged. If the vehicle is moving forward at high speed, then SOWC 60 will be slipping at 100. In that case, the second input tie-up condition is established by releasing all clutches except 68 and 70 at 108 and engaging clutches 68 and 70 at 110. The controller then waits at 112 for the SOWC slip to go to zero, which would happen if the vehicle comes to a stop. If the vehicle comes to a stop, the controller switches to the first tie-up condition such that vehicle movement in either direction is allowed.

Use of these input tie-up conditions in Neutral has additional advantages beyond avoid undesired torque transmission. A transition from one of these conditions to Drive, Low, or Reverse is faster and smoother because there is no need to bring the turbine shaft speed down during the engagement. If the first input tie-up condition is utilized, transitions to Reverse or Low are simplified because the SOWC is already in the active state.

In some implementations, use of an input tie-up condition in Neutral may be limited to situations in which the transmission fluid is cold. The risk of unintentional torque transmission is at its greatest when the fluid is cold. Furthermore, holding the turbine shaft 12 stationary in Neutral increases the rate at which transmission fluid warms up. Holding the turbine shaft stationary in Neutral may increase engine torque and therefore increase fuel consumption, so it may not be desirable in all conditions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a fluid coupling having an impeller and a turbine;
   a gearbox including a plurality of clutches and an output element, the gearbox being configured to establish various speed ratios between the turbine and the output, wherein one of the clutches is a one-way clutch; and
   a controller programmed to, responsive to (i) selection of a Neutral mode and (ii) a transmission fluid temperature being less than a threshold, engage a subset of the plurality of the clutches to hold the turbine stationary while permitting rotation of the output element, wherein the subset includes the one-way clutch.

2. The transmission of claim 1, wherein the controller is programmed to transition from a Drive or Reverse mode to the Neutral mode by releasing a first clutch of the plurality of clutches and engaging a second clutch of the plurality of clutches.

3. The transmission of claim 1, wherein the one-way clutch is a selectable one-way clutch having a passive state in which the selectable one-way clutch is permitted to overrun having an active state in which the selectable one-way clutch is locked.

4. A transmission comprising:
   a fluid coupling having an impeller and a turbine;
   a gearbox including a plurality of clutches and an output element, the gearbox being configured to establish various speed ratios between the turbine and the output element, wherein one of the clutches of the gearbox is a selectable one-way clutch having a passive state in which the selectable one-way clutch is permitted to overrun in a first direction and lock in a second direction and having an active state in which the selectable one-way clutch is locked in both the first and second directions; and
   a controller programmed to, responsive to selection of a Neutral mode, engage a subset of the plurality of the clutches to hold the turbine stationary while permitting rotation of the output element, wherein the selectable one-way clutch is included in the subset.

5. The transmission of claim 4, wherein the fluid coupling further includes a stator.

6. The transmission of claim 4, wherein the controller is programmed to transition from a Drive or Reverse mode to the Neutral mode by releasing a first clutch of the plurality of clutches and engaging a second clutch of the plurality of clutches.

7. The transmission of claim 4, wherein at least one of the clutches of the subset is a two-way clutch.

8. The transmission of claim 4, wherein one of the clutches of the subset is a brake.

9. The transmission of claim 4, wherein the engagement of the subset of clutches to hold the turbine stationary is performed further responsive to a transmission fluid temperature being less than a threshold.

10. A transmission comprising:
    a fluid coupling having an impeller and a turbine;
    a housing;
    a gearbox disposed in the housing and including:
    a turbine shaft connected to the turbine,
    an output element,
    a selectable one-way clutch having a passive state in which the selectable one-way clutch is permitted to overrun in a first direction and lock in a second direction and having an active state in which the selectable one-way clutch is locked in both the first and second directions, and
    a plurality of two-way clutches; and
    a controller programmed to:
    in response to the transmission being switched from a Drive mode to a Neutral mode and the selectable one-way clutch slipping below a threshold speed, command the selectable one-way clutch to the active state, command engagement of a first of the two-way clutches, and command disengagement of a remainder of the two-way clutches so the output element is permitted to rotate and the turbine shaft is rotationally locked to the housing, and
    in response to the transmission being switched from the Drive mode to the Neutral mode and the selectable one-way clutch slipping above the threshold speed, command engagement of a second and a third of the two-way clutches and command disengagement of a remainder of the two-way clutches.

11. The transmission of claim 10, wherein the controller is further programmed to, in response to the transmission being in the Neutral mode, the second and third two-way clutches being engaged, and the selectable one-way clutch slipping below the threshold speed, (i) command the selectable one-way clutch to the active state, (ii) disengage the second and third two-way clutches once the one-way clutch is in the active state, and (iii) engage the first two-way clutch once the second and third two-way clutches are disengaged.

12. The transmission of claim 10, wherein the second two-way clutch is a brake.

13. The transmission of claim 12, wherein the second two-way clutch circumscribes the third two-way clutch.

14. The transmission of claim 10, wherein the controller is further programmed to, in response to the transmission being switched from a reverse mode to the neutral mode, command disengagement of the second of the two-way clutches and command engagement of the first of the two-way clutches.

15. The transmission of claim 14, wherein the first of the two-way clutches is engaged subsequent to the disengagement of the second of the two-way clutches.

16. The transmission of claim 10, wherein the controller is further programmed to, in response to the transmission being switched from a Park mode to the Neutral mode, command engagement of at least one of the two-way clutches such that the transmission is in a full tied-up condition, command the selectable one-way clutch to the active state, command engagement of the first of the two-way clutches, command release of a parking pawl, and command disengagement of the at least one of the two-way clutches.

17. The transmission of claim 10, wherein the threshold speed is less than 20 revolutions per minute.

18. The transmission of claim 10, wherein the selectable one-way clutch is a brake when in the active state.

* * * * *